(12) United States Patent
Tsuchiya et al.

(10) Patent No.: US 7,195,469 B2
(45) Date of Patent: Mar. 27, 2007

(54) DUST SEAL IN A SCROLL FLUID MACHINE

(75) Inventors: Masaru Tsuchiya, Yokohama (JP); Youhei Midorikawa, Yokohama (JP)

(73) Assignee: Anest Iwata Corporation (JP)

( * ) Notice: Subject to any disclaimer, the term of this patent is extended or adjusted under 35 U.S.C. 154(b) by 32 days.

(21) Appl. No.: 11/101,940

(22) Filed: Apr. 8, 2005

(65) Prior Publication Data

US 2005/0249623 A1    Nov. 10, 2005

(30) Foreign Application Priority Data

May 7, 2004    (JP)    ............................. 2004-138404

(51) Int. Cl.
*F03C 2/00*    (2006.01)
*F04C 18/00*    (2006.01)

(52) U.S. Cl. .................... 418/55.4; 418/55.1; 418/142; 277/589

(58) Field of Classification Search ...... 418/55.1–55.6, 418/116, 142; 277/581, 583, 589, 903, 910
See application file for complete search history.

(56) References Cited

U.S. PATENT DOCUMENTS 3,418,001 A * 12/1968 Rentschler et al. ......... 277/589
3,663,024 A *  5/1972 Traub ......................... 277/589
5,366,358 A * 11/1994 Grenci et al. .............. 418/55.4
6,592,345 B2 *  7/2003 Suefuji et al. ............. 418/55.4
6,695,597 B2 *  2/2004 Kimura et al. ............ 418/55.4

FOREIGN PATENT DOCUMENTS

| DE | 4200530 A | * | 7/1992 |
|---|---|---|---|
| JP | 06213177 A | * | 8/1994 |
| JP | 07208353 A | * | 8/1995 |
| JP | 11062858 A | * | 3/1999 |
| JP | 2001336487 | | 12/2001 |

* cited by examiner

*Primary Examiner*—Theresa Trieu

(57) ABSTRACT

In a scroll fluid machine, a stationary scroll and an orbiting scroll are provided. On the stationary scroll opposing the orbiting scroll, an annular groove is formed. An O-ring, a flexible support ring and a sliding member are put in the annular groove. The support ring has legs between which the O-ring is held. The sliding member in sliding contact with the annular groove is placed on the support ring, thereby decreasing deterioration and keeping stable sealing.

20 Claims, 6 Drawing Sheets

PRIOR ART

DUST SEAL IN A SCROLL FLUID MACHINE

BACKGROUND OF THE INVENTION

The present invention relates to a dust seal in a scroll fluid machine such as a scroll compressor, a scroll vacuum pump, a scroll expander or a scroll blower.

A scroll fluid machine comprises a stationary scroll and an orbiting scroll which can be revolved around an eccentric axial portion of a drive shaft. A stationary wrap of the stationary scroll engages with an orbiting wrap of the orbiting scroll to form a sealed chamber between the stationary and orbiting scrolls. By rotating the drive shaft, the orbiting scroll is eccentrically revolved with respect to the stationary scroll so that a gas sucked through the outer circumference is compressed toward a center. To prevent leakage through the outer circumference of the scroll or to prevent dust from coming in from the outside, an annular dust seal is provided between the stationary and orbiting scrolls.

In FIG. 10, a dust seal is shown as 25. On a contact surface of between stationary and orbiting portions, there is formed an annular groove 24 in which a sliding member 27 is provided on a backup tube 26.

A stationary scroll 17 has an inlet 15 on the outer circumference and an outlet 16 at the center. A spiral stationary wrap 16 of the stationary scroll 17 engages with a spiral orbiting wrap 22 of an orbiting scroll 21 eccentrically revolved around an eccentric axial portion 20 of a drive shaft 19. An annular groove 24 is formed on the front surface of a stationary end plate 23 of the stationary scroll 17, and the dust seal 25 engages in the annular groove 24 to prevent a gas from leaking and dust from invading.

In FIG. 11, the dust seal 25 comprises the sliding member 27 and the backup tube 26 in the annular groove 24. The sliding member 27 is made of low-friction, heat-resistant, wear-resistant self-lubricating synthetic resin such as "Teflon"™ or metal. Its section is generally rectangular.

The backup tube 26 comprises a ring made of elastic sealing material such as silicone rubber or fluorine rubber.

In the backup tube made of silicone rubber, chemical resistance is low, while in the backup tube made of fluorine rubber, chemical resistance is high but it manufacture is difficult.

Even if the backup tube is made of any of the materials, repulsive force decreases with time, so that pressing force by the sliding member 27 decreases.

SUMMARY OF THE INVENTION

In view of the disadvantages, it is an object of the invention to provide a dust seal in a scroll fluid machine in which an improved backup member is provided behind or inside a sliding member instead of a known backup tube to decrease deterioration and provide stable sealing at any time.

BRIEF DESCRIPTION OF THE DRAWINGS

The features and advantages of the present invention will become more apparent from the following description with respect to embodiments as shown in appended drawings wherein.

DETAILED DESCRIPTION OF PREFERRED EMBODIMENTS

FIGS. 1 to 7 are vertical sectional views of dust seals in a scroll fluid machine according to the present invention, and in the following description, the bottom and top of an annular groove are deemed "inner" and "outer" respectively.

Figure 1:
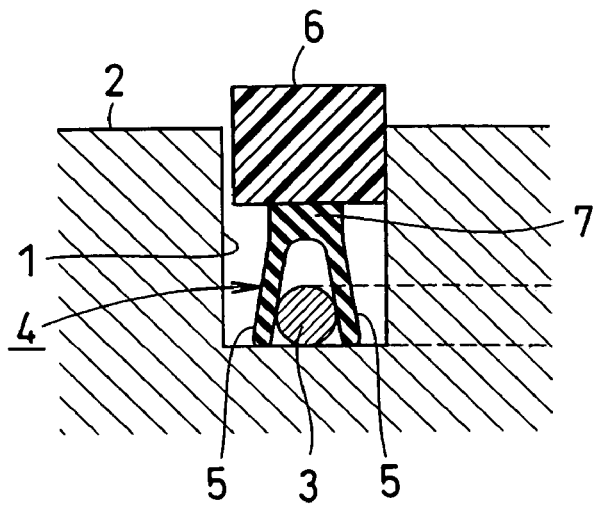
FIG. 1 is a vertical sectional view of the first embodiment of a dust seal according to the present invention.

FIG. 1 shows the first embodiment of the present invention, and numeral 1 denotes an annular groove on a stationary end plate 2 of a stationary scroll and surrounds an engagement portion with an ordinary scroll (not shown).

An O-ring 3 is disposed on the bottom of the annular groove 1 and held by legs 5,5 of an inverted U-shaped flexible support ring 4 in the annular groove 1.

An annular sliding member 6 slidably engages in the annular groove 1 on the support ring 4 to project from the annular groove 1. The O-ring 3 is seamless and made of fluorine rubber. The support ring 4 is made of fluorine rubber having chemical resistance and elasticity. The legs 5,5 of the support ring 4 are determined in thickness and inclination to enable the O-ring 3 to be held suitably and elastically between the legs 5 and 5 and to enable the legs not to be collapsed during ordinary operation.

The sliding member 6 is made of chemical resistant material and may be seamy or seamless.

The legs 5,5 of the support ring 4 holds the O-ring 3 elastically to apply outward elastic force to the support ring 4. The sliding member 6 is in sliding contact with an end plate of an opposite orbiting scroll and acts as dust seal.

Figure 2:
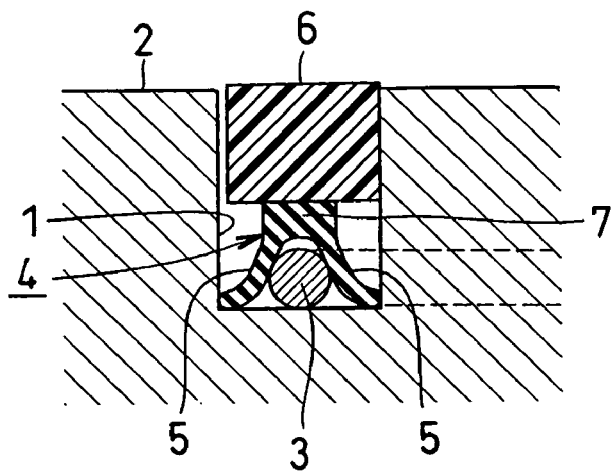
FIG. 2 is a vertical sectional view of the dust seal in FIG. 1 which is pressed inward.

As shown in FIG. 2, significantly high force is applied to the sliding member 6 inward, so that the legs 5,5 of the support ring 4 is flexed to enable the ends of the legs 5,5 to press the corners of the annular groove 1 thereby increasing repulsive force of the support ring 4 to prevent the support ring 4 from being collapsed. Thus, failure in operation is prevented.

Whether or not the sliding member 6 is projected from the annular groove 1, stable sealing is always kept.

Figure 3:
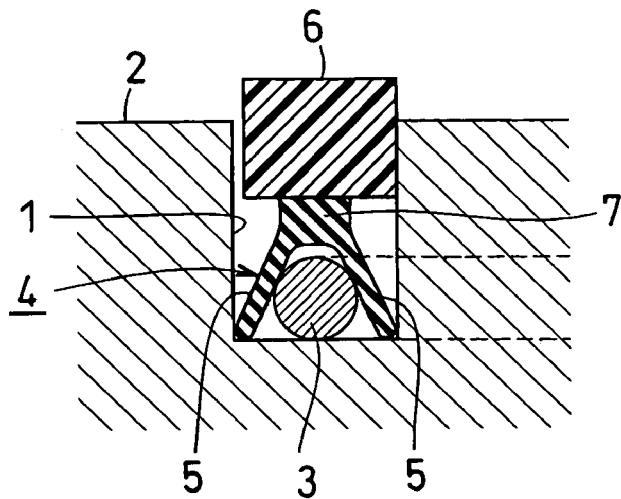
FIG. 3 is a vertical sectional view of the second embodiment of a dust seal according to the present invention.

FIG. 3 shows the second embodiment of the present inventions in which the ends of legs 5,5 of a support ring 4 engage with the corners of an annular groove 1 even when a sliding member 6 is unloaded.

Outward force is variable in proportion to inward force to the sliding member 6, which is advantageous.

In FIGS. 1 to 3, the inner surface of the sliding member 6 may be merely contacted with the outer surface of a connecting portion 7 for connecting the legs 5,5 of the support ring 4 or bonded with each other.

Figure 4:
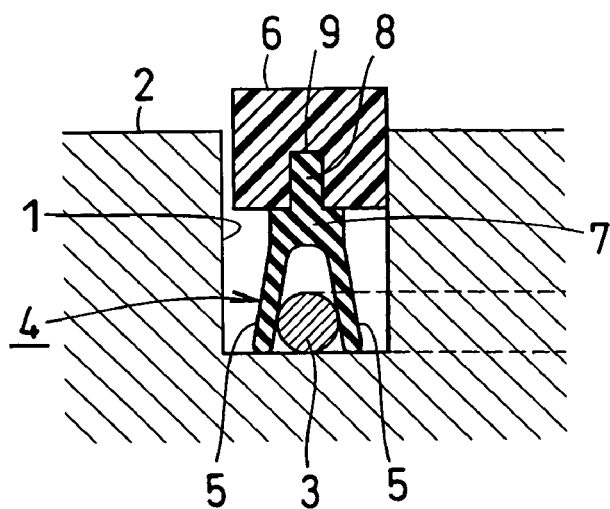
FIG. 4 is a vertical sectional view of the third embodiment of a dust seal according to the present invention.

In FIG. 4 showing the third embodiment of the present invention, a narrower engagement portion 8 is projected from the outer surface of a connecting portion 7 of a support ring 4 to engage in an annular engagement groove 9. The engagement may be bonded by an adhesive. The engagement portion 8 may be equal in width to the connecting portion 7.

Figure 5:
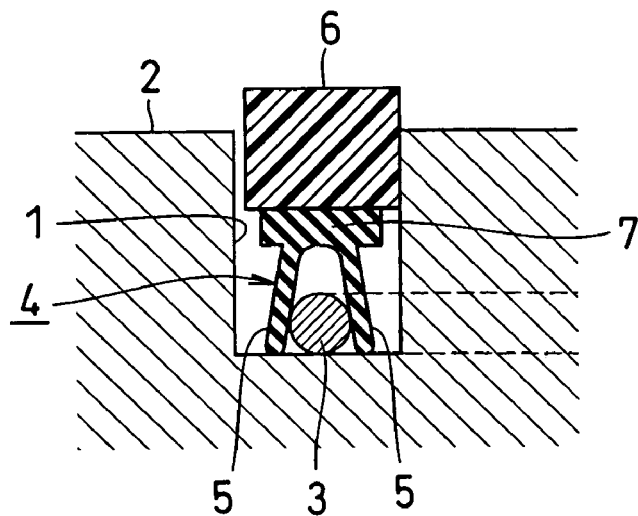
FIG. 5 is a vertical sectional view of the fourth embodiment of a dust seal according to the present invention.

FIG. 5 is the fourth embodiment of the present invention, in which a connecting portion 7 extends beyond legs 5,5 of a support ring 4 to increase contact area between a sliding member 6 and the support ring 4 thereby assuring stable support. Also sideward motion of the support ring 4 in an annular groove 1 is limited to enable an O-ring 3 to be held more stably.

Figure 6:
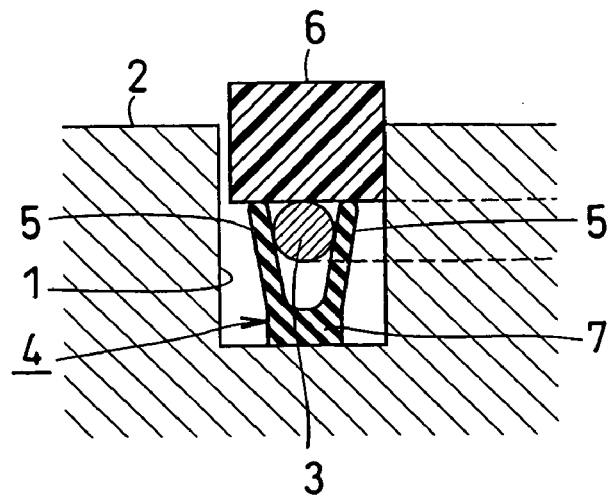
FIG. 6 is a vertical sectional view of the fifth embodiment of a dust seal according to the present invention.

FIG. 6 is the fifth embodiment of the present invention, in which legs 5,5 of a support ring 4 is directed outward. The outer ends of the legs 5,5 and an O-ring 3 supported therebetween contact the inner surface of a sliding member 6. After the support ring 4 is put in an annular groove 1, an O-ring 3 can easily be inserted or removed, which is advantageous for replacement of the O-ring 3.

Figure 7:
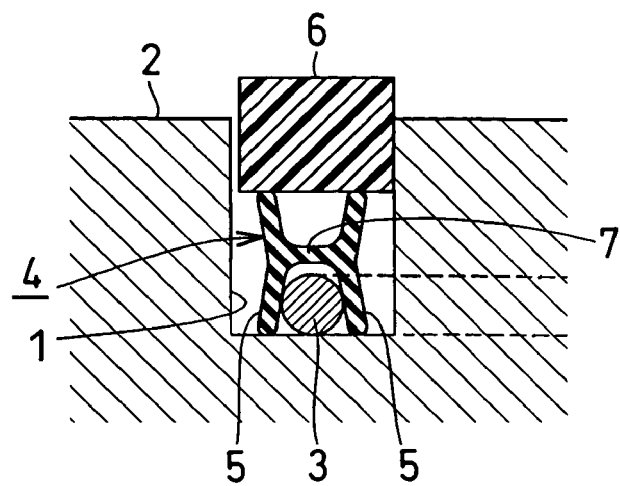
FIG. 7 is a vertical sectional view of the sixth embodiment of a dust seal according to the present invention.

FIG. 7 is the sixth embodiment of the present invention, in which legs 5,5 of a support ring 4 is connected in the middle by a connecting portion 7 and an O-ring 3 is held by the bottom of an annular groove 1, the legs 5,5 and the connecting portion 7. Thus, the supporting ring 4 enables higher outward elastic force to apply to the sliding member 6.

Figure 8:
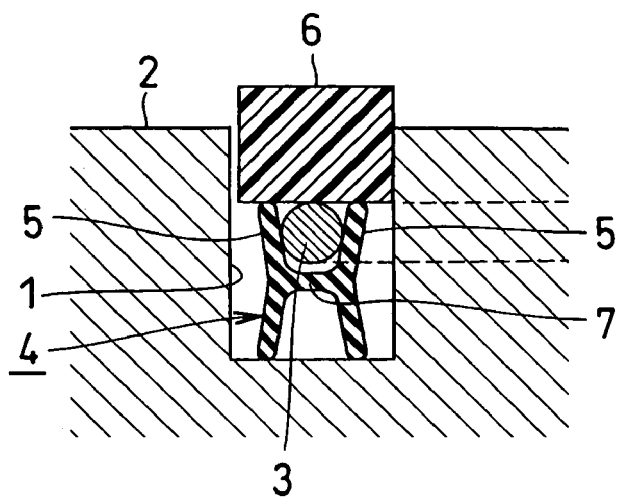
FIG. 8 is a vertical sectional view of the seventh embodiment of a dust seal according to the present invention.

FIG. 8 is the seventh embodiment of the present invention, in which legs 5,5 of a support ring 4 is connected in the middle by a connecting portion 7 and an O-ring 3 is held by a sliding member 6, the legs 5,5 and the connecting portion 7.

Figure 9:
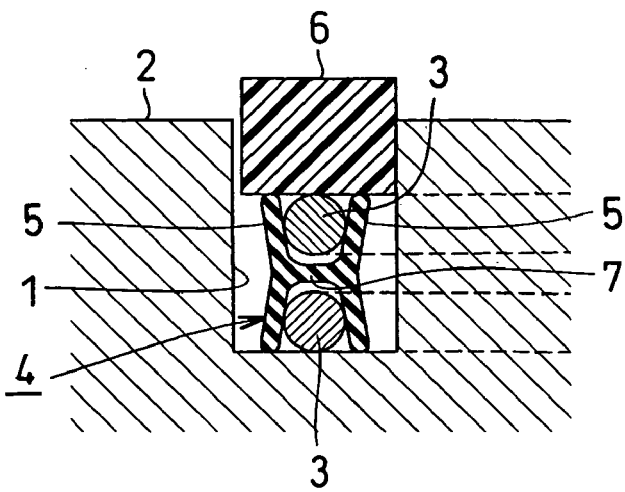
FIG. 9 is a vertical sectional view of the eighth embodiment of a dust seal according to the present invention.
Figure 10:
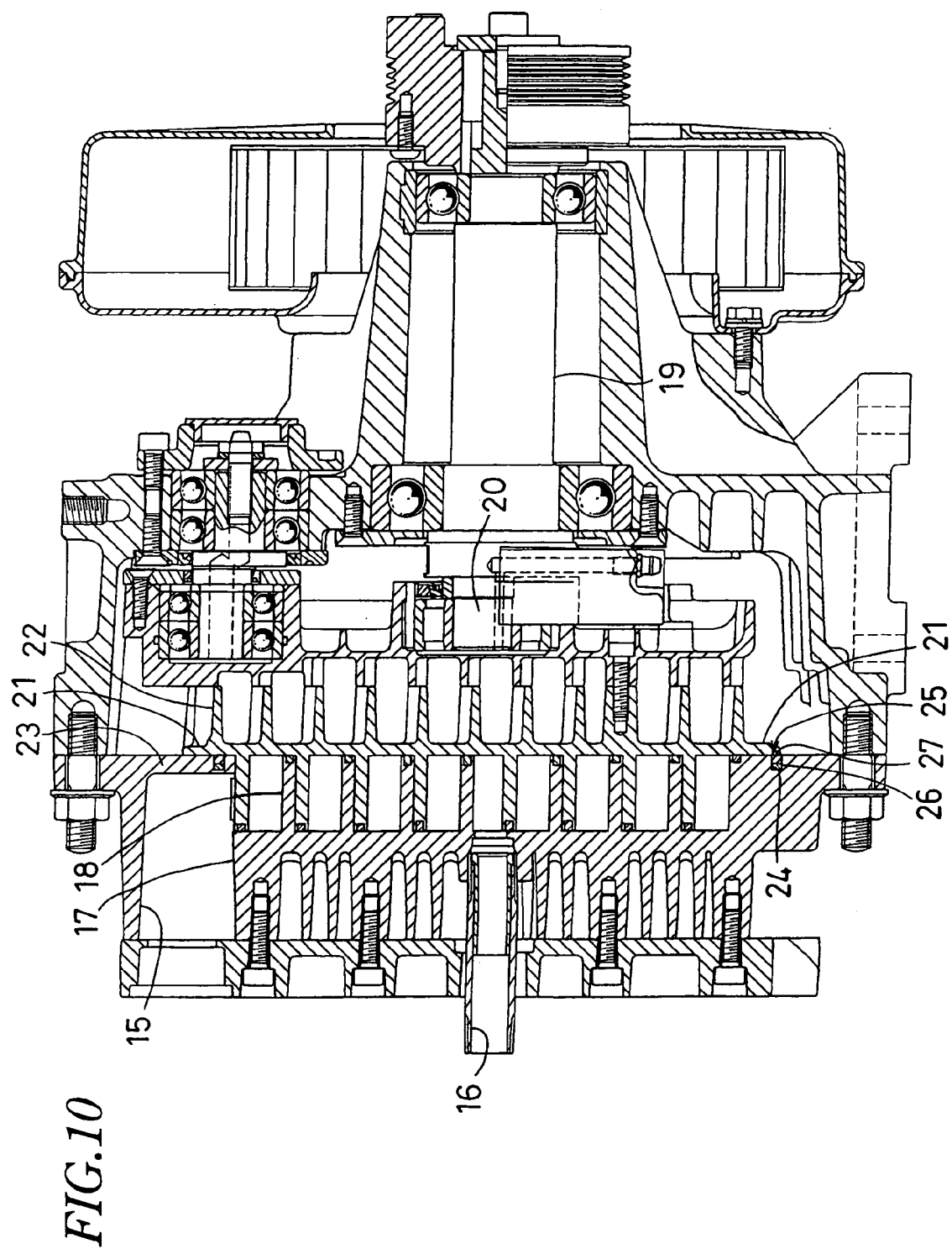
FIG. 10 is a vertical sectional side view of a scroll fluid machine.
Figure 11:
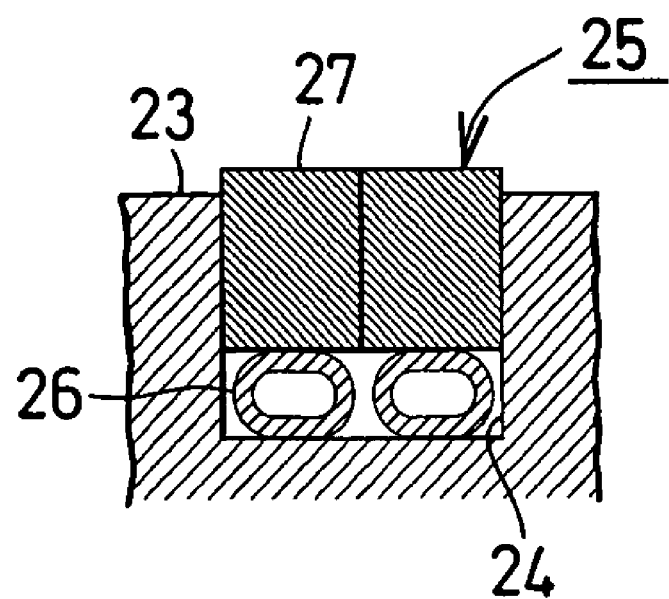
FIG. 11 is a vertical sectional view of a known dust seal in the scroll fluid machine in FIG. 10.

FIG. 9 is the eighth embodiment of the present invention, in which legs 5,5 of a support ring 4 is connected in the middle by a connecting portion 7, and an O-rings 3 is held by a sliding member 6, the legs 5,5 and the connecting portion 7 and another O-ring 3 is held by an end plate 2, the legs 5,5 and the connecting portion 7.

Figure 12:
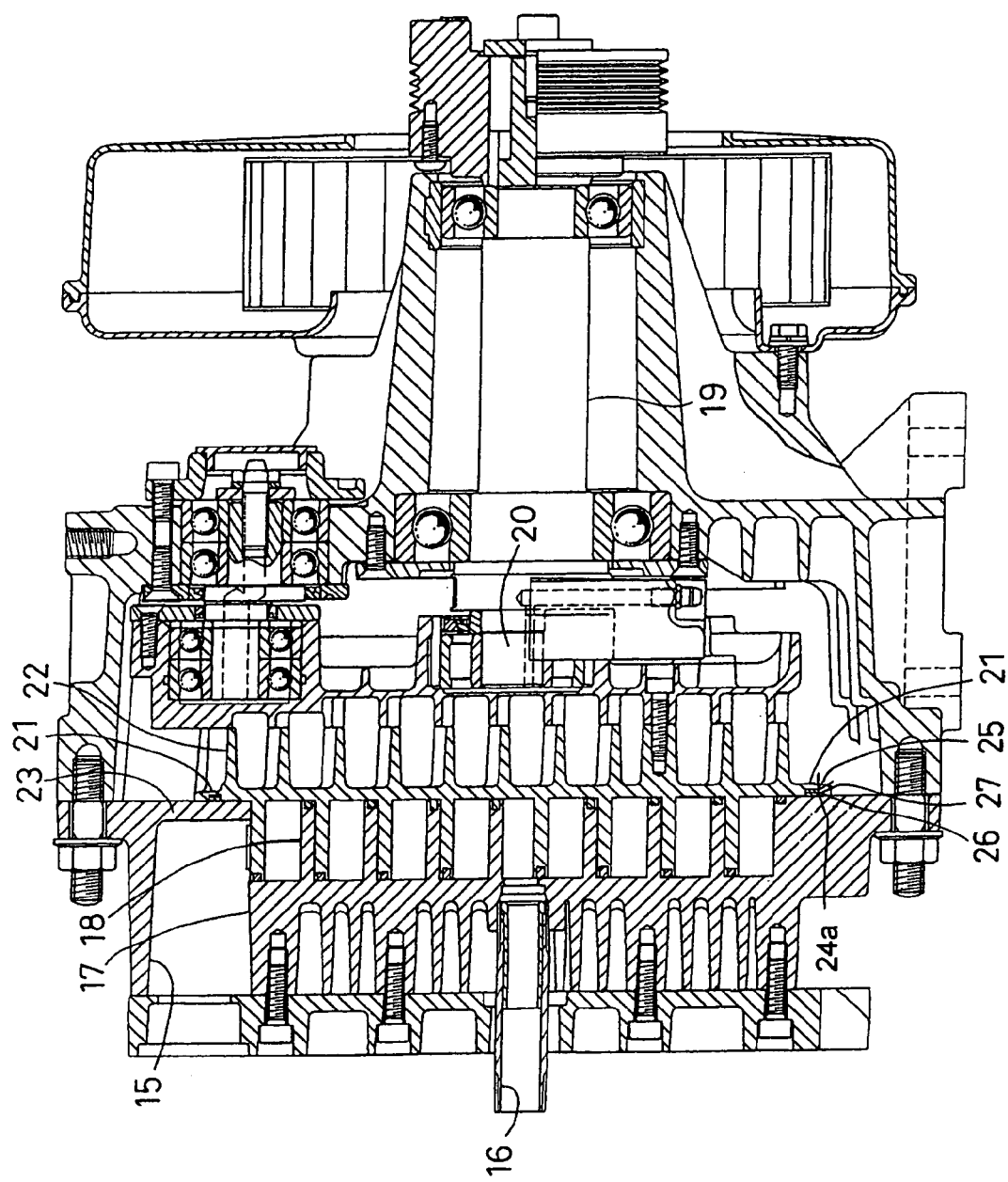
FIG. 12 is an embodiment in which an annular groove 24a is formed in an orbiting scroll 21.

FIG. 12 shows an embodiment in which an annular groove 24a is formed in an orbiting scroll 21. In the annular groove 24a, there is provided a dust seal 25 which comprises a sliding member 27 on a back up tube 26.

The foregoing merely relates embodiments of the invention. Various modifications and changes may be made by persons skilled in the art without departing from the scope of claims wherein:

What is claimed is:

1. A dust seal in a scroll fluid machine, comprising:
   an annular groove having a bottom on a stationary scroll;
   an O-ring in the annular groove;
   a support ring comprising a connecting portion and legs that hold the O-ring; and
   an annular sliding member in sliding contact with the annular groove on the support ring.

2. A dust seal as claimed in claim 1 wherein the legs of the support ring and the O-ring contact the bottom of the annular groove.

3. A dust seal as claimed in claim 1 wherein the O-ring contacts the bottom of the annular groove, the legs engaging with inner corners of the annular groove.

4. A dust seal as claimed in claim 1 wherein the connecting portion of the support ring is bonded to the sliding member.

5. A dust seal as claimed in claim 1 wherein part of the connecting portion of the support ring contacts the sliding member.

6. A dust seal as claimed in claim 1 wherein the connecting portion of the support ring extends beyond width of the legs.

7. A dust seal as claimed in claim 1 wherein the connecting portion of the support ring contacts the bottom of the annular groove, while the legs contact the sliding member and the O-ring.

8. A dust seal as claimed in claim 1 wherein the connecting portion of the support ring is provided in the middle of the legs so that the O-ring is put between the legs that contact the bottom of the annular groove.

9. A dust seal as claimed in claim 1 wherein the connecting portion of the support ring is provided in the middle of the legs so that the O-ring is put between the legs that contact the sliding member.

10. A dust seal as claimed in claim 1 wherein the connecting portion of the support ring is provided in the middle of the legs so that the O-ring is put between the legs that contact the bottom of the annular groove and another O-ring is put between the legs that contact the sliding member respectively.

11. A dust seal in a scroll fluid machine, comprising:
    an annular groove having a bottom on an orbiting scroll;
    an O-ring in the annular groove;
    a support ring comprising a connecting portion and legs that hold the O-ring; and
    an annular sliding member in sliding contact with the annular groove on the support ring.

12. A dust seal as claimed in claim 11 wherein the legs of the support ring and the O-ring contact the bottom of the annular groove.

13. A dust seal as claimed in claim 11 wherein the O-ring contacts the bottom of the annular groove, the legs engaging with inner corners of the annular groove.

14. A dust seal as claimed in claim 11 wherein the connecting portion of the support ring is bonded to the sliding member.

15. A dust seal as claimed in claim 11 wherein part of the connecting portion of the support ring contacts the sliding member.

16. A dust seal as claimed in claim 11 wherein the connecting portion of the support ring extends beyond width of the legs.

17. A dust seal as claimed in claim 11 wherein the connecting portion of the support ring contacts the bottom of the annular groove, while the legs contact the sliding member and the O-ring.

18. A dust seal as claimed in claim 11 wherein the connecting portion of the support ring is provided in the middle of the legs so that the O-ring is put between the legs that contact the bottom of the annular groove.

19. A dust seal as claimed in claim 11 wherein the connecting portion of the support ring is provided in the middle of the legs so that the O-ring is put between the legs that contact the sliding member.

20. A dust seal as claimed in claim 11 wherein the connecting portion of the support ring is provided in the middle of the legs so that the O-ring is put between the legs that contact the bottom of the annular groove and another O-ring is put between the legs that contact the sliding member respectively.

* * * * *